(12) United States Patent
Wei (10) Patent No.: US 11,409,159 B2
(45) Date of Patent: Aug. 9, 2022

(54) 3D DISPLAY APPARATUS

(71) Applicant: BOE TECHNOLOGY GROUP CO., LTD., Beijing (CN)

(72) Inventor: Wei Wei, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 500 days.

(21) Appl. No.: 16/469,378

(22) PCT Filed: Dec. 18, 2018

(86) PCT No.: PCT/CN2018/121717
§ 371 (c)(1),
(2) Date: Jun. 13, 2019

(87) PCT Pub. No.: WO2019/174342
PCT Pub. Date: Sep. 19, 2019

(65) Prior Publication Data
US 2021/0356811 A1 Nov. 18, 2021

(30) Foreign Application Priority Data
Mar. 15, 2018 (CN) .......................... 201810214589.3

(51) Int. Cl.
*G02F 1/1335* (2006.01)
*G02B 30/25* (2020.01)
(Continued)

(52) U.S. Cl.
CPC ....... *G02F 1/133531* (2021.01); *G02B 30/25* (2020.01); *G02F 1/1337* (2013.01);
(Continued)

(58) Field of Classification Search
None
See application file for complete search history.

(56) References Cited

U.S. PATENT DOCUMENTS 5,805,250 A * 9/1998 Hatano ................ H04N 13/398
349/96
6,084,647 A * 7/2000 Hatano .................. G02B 30/25
349/15
(Continued)

FOREIGN PATENT DOCUMENTS

CN 1727957 A 2/2006
CN 102223563 A 10/2011
(Continued)

OTHER PUBLICATIONS

International Search Report dated Feb. 27, 2019, issued in counterpart application No. PCT/CN2018/121717. (12 pages).
(Continued)

*Primary Examiner* — Ryan Crockett
(74) *Attorney, Agent, or Firm* — WHDA, LLP (57) ABSTRACT

The present disclosure relates to a 3D display apparatus. The 3D display apparatus may include a first substrate, a second substrate, a liquid crystal layer between the first substrate and the second substrate, a first alignment layer on the first substrate, a second alignment layer on the second substrate, a polarizer, and an analyzer between the second alignment layer and the second substrate. The polarizer may be on a side of the first substrate opposite from the first alignment layer or between the first substrate and the first alignment layer. The polarizer may be configured to form two types of linearly polarized light being alternately arranged, and polarization directions of the two types of linearly polarized light are perpendicular to each other.

13 Claims, 9 Drawing Sheets

(51) Int. Cl.
*G02F 1/13363* (2006.01)
*G02F 1/1337* (2006.01)

(52) U.S. Cl.
CPC .. *G02F 1/133514* (2013.01); *G02F 1/133565* (2021.01); *G02F 1/133638* (2021.01); *G02F 2413/02* (2013.01); *G02F 2413/06* (2013.01); *G02F 2413/08* (2013.01)

(56) References Cited

U.S. PATENT DOCUMENTS

| | | | |
|---|---|---|---|
| 2003/0107686 A1* | 6/2003 | Sato | H04N 13/38 349/15 |
| 2006/0023143 A1 | 2/2006 | Lee | |
| 2009/0310044 A1* | 12/2009 | Lee | H04N 13/356 349/15 |
| 2010/0007270 A1* | 1/2010 | Suh | H01L 27/322 313/504 |
| 2010/0151393 A1* | 6/2010 | Kim | B81C 1/00031 430/322 |
| 2013/0300988 A1* | 11/2013 | Zhong | G02F 1/133514 349/106 |
| 2014/0226094 A1 | 8/2014 | Lee et al. | |
| 2014/0268002 A1 | 9/2014 | Inomata et al. | |
| 2017/0371202 A1* | 12/2017 | He | G02F 1/133528 |
| 2021/0200012 A1* | 7/2021 | Zeng | G02F 1/13363 |

FOREIGN PATENT DOCUMENTS

| | | |
|---|---|---|
| CN | 202563213 U | 11/2012 |
| CN | 202748540 U | 2/2013 |
| CN | 104503165 A | 4/2015 |
| CN | 104950497 A | 9/2015 |
| CN | 105093554 A | 11/2015 |
| JP | S60-230102 A | 11/1985 |

OTHER PUBLICATIONS

Office Action dated Mar. 12, 2020, issued in counterpart CN Application No. 201810214589.3, with English Translation. (15 pages).

Extended (Supplementary)European Search Report dated Jan. 4, 2022, issued in counterpart EP Application No. 18889944.7. (12 pages).

\* cited by examiner

3D DISPLAY APPARATUS

CROSS-REFERENCE TO RELATED APPLICATIONS

This application claims benefit of the filing date of Chinese Patent Application No. 201810214589.3 filed on Mar. 15, 2018, the disclosure of which is hereby incorporated in its entirety by reference.

TECHNICAL FIELD

The present disclosure relates to display technology, and particularly to a 3D display apparatus.

BACKGROUND 3D technology has become more and more popular because 3D technology can make the image stereoscopic as well as make the audience feel immersive. In 3D technology, the image is no longer limited to the plane of the screen.

BRIEF SUMMARY

An embodiment of the present disclosure provides a 3D display apparatus. The 3D display apparatus may include a first substrate, a second substrate, a liquid crystal layer between the first substrate and the second substrate, a first alignment layer on the first substrate, a second alignment layer on the second substrate, a polarizer, and an analyzer between the second alignment layer and the second substrate. The polarizer may be on a side of the first substrate opposite from the first alignment layer or between the first substrate and the first alignment layer, and the polarizer may be configured to form two types of linearly polarized light being alternately arranged, and polarization directions of the two types of linearly polarized light being perpendicular to each other.

Optionally, the display apparatus further comprises a color film layer between the first substrate and the second substrate.

Optionally, the color film layer is between the second alignment layer and the analyzer.

Optionally, the color film layer is between the analyzer and the second substrate.

Optionally, the polarizer comprises a plurality of alternately arranged first polarizing units and second polarizing units, a polarization direction of each of the plurality of first polarizing units is perpendicular to a polarization direction of each of the plurality of second polarizing units.

Optionally, the analyzer comprises a plurality of alternately arranged first analyzer units and second analyzer units.

Optionally, each of the plurality of first analyzer units corresponds to one of the plurality of first polarizing units and a polarization direction of each of the plurality of first analyzer units is perpendicular to a polarization direction of the corresponding one of the plurality of first polarizing units. Each of the plurality of second analyzer units corresponds to one of the plurality of second polarizing units and a polarization direction of each of the plurality of second analyzer units is perpendicular to a polarization direction of the corresponding one of the plurality of second polarizing units.

Optionally, the first alignment layer and the second alignment layer each comprise odd-numbered columns and even-numbered columns. The odd-numbered columns of the first alignment layer and the odd-numbered columns of the second alignment layer correspond to the first polarization units respectively, the even-numbered columns of the first alignment layer and the even-numbered columns of the second alignment layer correspond to the second polarization units respectively.

Optionally, the odd-numbered columns of the first alignment layer and the even-numbered columns of the second alignment layer each have a first alignment direction, and the even-numbered columns of the first alignment layer and an odd-numbered columns of the second alignment layer each have a second alignment direction; the first alignment direction and the second alignment direction being respectively substantially the same as the polarization directions of the two linearly polarized light generated by the polarizer.

Optionally, the odd-numbered columns and the even-numbered columns of the first alignment layer respectively correspond to one column of sub-pixels of the 3D display apparatus.

Optionally, the display apparatus further comprises a quarter-wave plate between the analyzer and the second substrate, wherein an optical axis of the quarter-wave plate is respectively at a 45° angle to the polarization directions of the two types of linearly polarized light.

Optionally, each of the first polarizing units comprises a first polarizer and a half wave plate, each of the second polarizing unit comprises a second polarizer and the half wave plate, and the first polarizer and the second polarizer are integrally formed.

Optionally, the first polarizer, the second polarizer, and the half wave plate are on a side of the first substrate opposite from the first alignment layer, and the half wave plate is between the first polarizer and the first substrate.

Optionally, the half-wave plate corresponds to the position of a column of sub-pixels of the 3D display apparatus.

Optionally, a width of each of the first polarizing units, a width of each of the second polarizing units, a width of each of the first analyzer units, a width of each of the second analyzer units, a width of each of the odd-numbered columns of the first alignment layer, and a width of each of the even-numbered columns of the first alignment layer, a width of each of the odd-numbered columns of the second alignment layer, and a width of each of the even-numbered columns of the second alignment layer are substantially equal to one another.

Optionally, the display apparatus further comprises an anti-reflection layer, the anti-reflection layer being on a side of the second substrate opposite from the analyzer.

Optionally, the analyzer is a first bidirectional metal grating polarizer.

Optionally, the polarizer is a second bidirectional metal grating polarizer.

BRIEF DESCRIPTION OF THE DRAWINGS

The subject natter which is regarded as the disclosure is particularly pointed out and distinctly claimed in the claims at the conclusion of the specification. The foregoing and other objects, features, and advantages of the present disclosure are apparent from the following detailed description taken in conjunction with the accompanying drawings in which:

DETAILED DESCRIPTION

The present disclosure will be described in further detail with reference to the accompanying drawings and embodiments in order to provide a better understanding by those skilled in the art of the technical solutions of the present disclosure. Throughout the description of the disclosure, reference is made to FIGS. 1-5. When referring to the figures, like structures and elements shown throughout are indicated with like reference numerals.

With the development of 3D technology, thinning of 3D display apparatus and increasing stereoscopic viewing angle have become focus of current research in 3D technology. In the related art, the 3D display apparatus places a upper polarizer and positive and negative quarter-wave plates originally placed outside the display module inside the display module, thereby reducing the thickness of the entire display module. However, since the upper polarizer is usually formed of a resin film, it is difficult to form the upper polarizer on the substrate. Thus, it is difficult to form the polarizer inside the display module from the viewpoint of the process, thereby making the process difficult.

Another existing 3D display apparatus is to increase the viewing angle by adding black frames between the left and right views, but this will greatly reduce the brightness and resolution of the 3D display apparatus.

Accordingly, one example of the present disclosure provides a 3D display apparatus, as shown in FIGS. 1a-1d. The 3D display apparatus includes: a first substrate 1, a second substrate 2, and a liquid crystal layer 3. The 3D display apparatus further includes a polarizer 4, an analyzer 5, a first alignment layer 6 on the first substrate 1, and a second alignment layer 7 on the second substrate 2. The polarizer 4 is located on a side of the first alignment layer 6 facing the first substrate 1, and includes a plurality of first polarizing units and a plurality of second polarizing units, which are alternately arranged. The polarization direction of the first polarizing unit is perpendicular to the polarization direction of the second polarizing unit, thereby forming backlight including two types of linearly polarized light. The two types of linearly polarized light are alternately arranged and polarization directions of the two types of linearly polarized light are perpendicular to each other.

The analyzer 5 is located between the second alignment layer 7 and the second substrate 2, and includes a plurality of first analyzer units and a plurality of second analyzer units, which are alternately arranged. The first analyzer unit corresponds to the position of the first polarizing unit of the polarizer 4, and the polarization direction of the lint analyzer unit is perpendicular to the polarization direction of the first polarizing unit. The second analyzer unit corresponds to the position of the second polarizing unit of the polarizer 4, and the polarization direction of the second analyzer unit is perpendicular to the polarization direction of the second polarizing unit.

In some embodiments, the 3D display apparatus thither includes a color film layer 8 between the first substrate 1 and the second substrate 2.

Figure 1A:
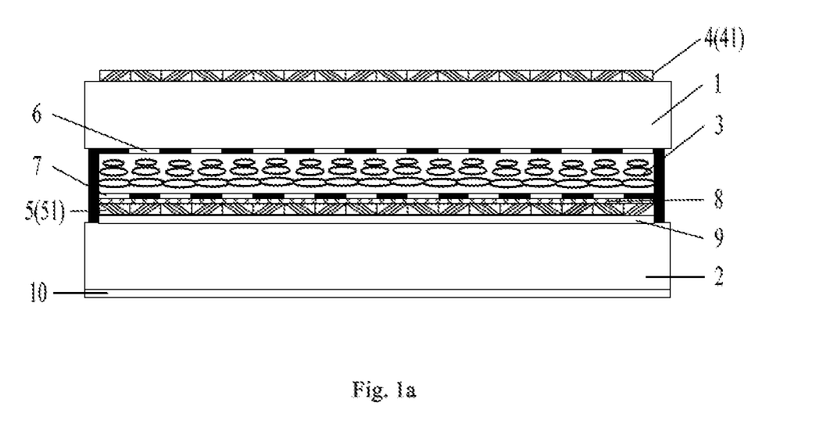
FIG. 1a is a structural diagram of a 3D display apparatus according to one embodiment of the present disclosure.
Figure 1B:
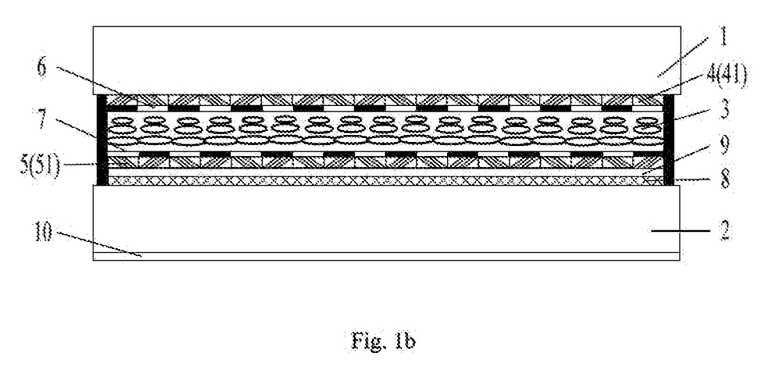
FIG. 1b is a structural diagram of a 3D display apparatus according to one embodiment of the present disclosure.
Figure 1C:
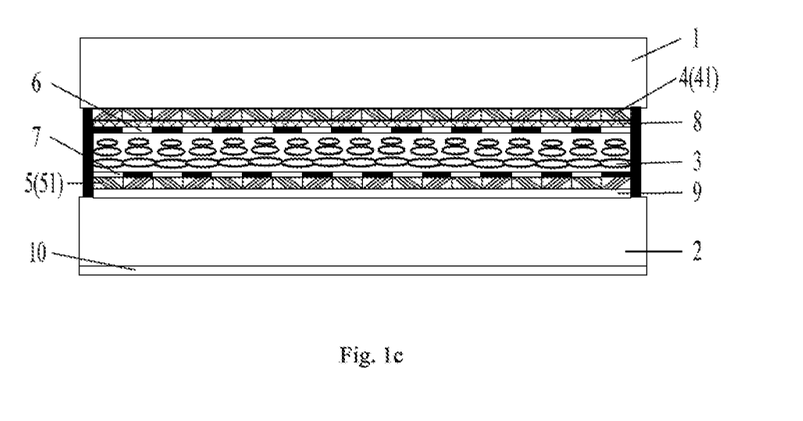
FIG. 1c is a structural diagram of a 3D display apparatus according to one embodiment of the present disclosure.
Figure 1D:
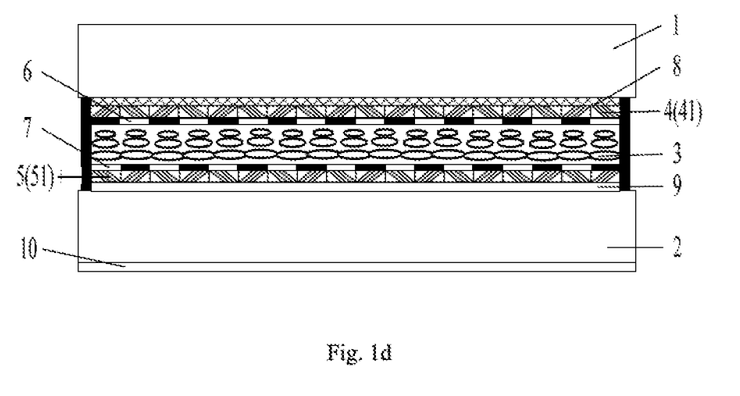
FIG. 1d is a structural diagram of a 3D display apparatus according to one embodiment of the present disclosure.
Figure 3:
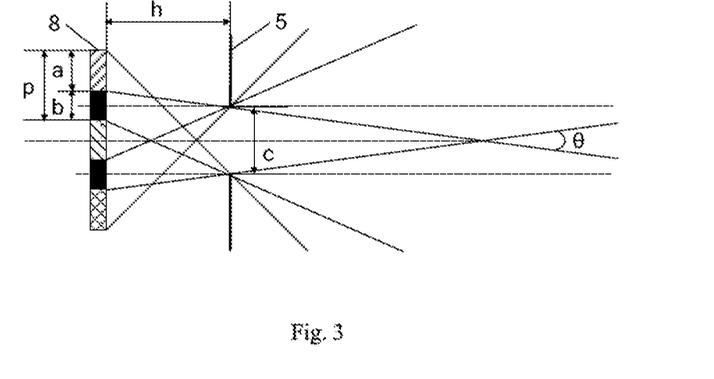
FIG. 3 is a schematic view of an optical path according to one embodiment of the present disclosure.

FIG. 3 is a light path diagram of the display apparatus corresponding to FIG. 1c and FIG. 1d. As shown in FIG. 3, a is the width of the R, G, B color resistance in the color film layer 8, and b is the width of the black matrix in the color layer 8, p=a+b, c is the opening width of the analyzer 5, h is the distance between the color film layer 8 and the analyzer 5, and θ is the viewing angle of the 3D display apparatus in the vertical direction. According to the optical path, the formula (1) below can be obtained.

$$\tan\frac{\theta}{2} = \frac{2p - a - c}{2h} \quad (1)$$

It can be seen from the formula (1) that the smaller the distance h between the color filter layer 8 and the analyzer 5, the larger the viewing angle θ. Accordingly, the viewing angle θ can be enlarged by reducing the distance h between the color filter layer 8 and the analyzer 5.

In the 3D display apparatus of the present disclosure, a polarizer is used to form backlight including two types of linearly polarized light which are alternately arranged and whose polarization directions are perpendicular to each other. The polarizer includes a plurality of alternately arranged first polarizing units and second polarizing units, and the polarization direction of the first polarizing unit is perpendicular to the polarization direction of the second polarizing unit. The analyzer is disposed inside the 3D display apparatus, and includes a plurality of alternately arranged first analyzer units and second analyzer units. The position of the first analyzer unit of the analyzer corresponds to the position of the first polarizing unit of the polarizer, and the polarization directions of the first analyzer unit and the first polarizing unit are perpendicular to each other. The position of the second analyzer unit of the analyzer corresponds to the position of the second polarizing unit of the polarizer, and the polarization directions of the second analyzer unit and the second polarizing unit are perpendicular to each other. The analyzer operates in cooperation with the polarizer and the liquid crystal layer to implement image display.

Thus, by disposing the analyzer inside the 3D display apparatus, the distance between the analyzer and the color film layer can be reduced, thereby expanding the viewing angle, reducing the volume of the 3D display apparatus, and accordingly realizing a thin and light display apparatus. Furthermore, the process of the present disclosure is simple, easy to implement, and without the need to add black frames. Furthermore, the brightness and resolution of the 3D display apparatus are balanced.

Figure 2:
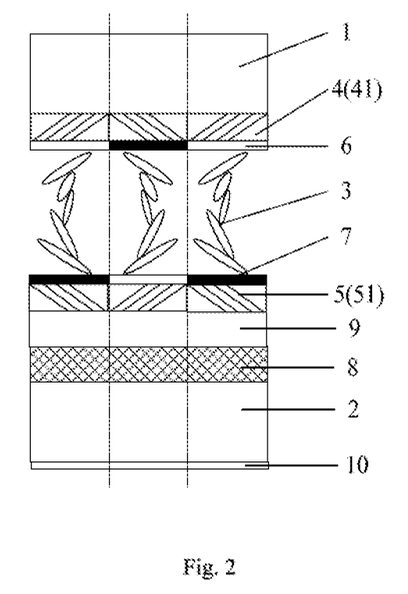
FIG. 2 is a partial enlarged view of FIG. 1b.

In some embodiments, as shown in FIG. 2, the first alignment layer 6 and the second alignment layer 7 each include odd-numbered columns and even-numbered columns of equal width. The odd-numbered columns of the first alignment layer 6 and the odd-numbered columns of the second alignment layer 7 correspond to the positions of the first polarizing units of the polarizer 4 respectively. The even-numbered columns of the first alignment layer 6, the even-numbered columns of the second alignment layer 7 correspond to the positions of the second polarization units of the polarizer 4 respectively. The odd-numbered columns of the first alignment layer 6 and the even-numbered columns of the second alignment layer 7 have a first alignment direction, and the even-numbered columns of the first alignment layer 6 and the odd-numbered columns of the second alignment layer 7 have a second alignment direction. The first alignment direction and the second alignment direction are respectively the same as the polarization directions of the two types of linearly polarized light generated by the polarizer 4. That is, the first alignment direction is the same as the polarization direction of one type of linearly polarized light generated by the polarizer 4, and the second alignment direction is the same as the polarization direction of the other type of linearly polarized light generated by the polarizer 4. The first alignment direction and the second alignment direction are perpendicular to each other.

In some embodiments, as shown in FIG. 2, an odd-numbered column and an even-numbered column of the first alignment layer 6 correspond to a position of a column of sub-pixels of the 3D display apparatus. As such, the 3D vertical viewing angle is at the maximum.

The first alignment layer 6 can be formed by curing using a linearly polarized light. The linearly polarized light sequentially cures the odd-numbered and even-numbered columns through an equally spaced mask. The second alignment layer 7 also can be formed by curing using a linearly polarized light. The alignment directions of the odd-numbered columns and even-numbered columns of the second alignment layer 7 are opposite to the alignment directions of the odd-numbered columns and even-numbered columns of the first alignment layer 6 respectively.

In some embodiments, as shown in FIGS. 1a-1d and 2, the analyzer 5 may be a first bidirectional metal grating polarizer 51. The first bidirectional metal grating polarizer 51 includes odd-numbered columns and even-numbered columns of equal width, and the odd-numbered column thereof represents the first analyzer unit, and the even-numbered column thereof represents the second analyzer unit.

In some embodiments, an odd-numbered column and an even-numbered column of the first bidirectional metal grating polarizer 51 respectively correspond to a position of a column of sub-pixels of the 3D display apparatus. That is, odd-numbered columns of the first alignment layer 6 and odd-numbered columns of the second alignment layer 7 correspond to odd-numbered columns of the first bidirectional metal grating polarizer 51, respectively. Furthermore, odd-numbered columns of the first alignment layer 6 and odd-numbered columns of the second alignment layer 7 correspond to the positions of columns of sub-pixels of the 3D display apparatus respectively. Even-numbered columns of the first alignment layer 6 and even-numbered columns of the second alignment layer 7 correspond to even-numbered columns of the first bidirectional metal grating polarizer 51, respectively. Furthermore, even-numbered columns of the first alignment layer 6 and even-numbered columns of the second alignment layer 7 correspond to the positions of columns of sub-pixels of the 3D display apparatus respectively. As such, the 3D vertical viewing angle is at the maximum.

The preparation of the first bidirectional metal grating polarizer 51 will be described in detail later with reference to FIG. 5.

In some embodiments, as shown in FIG. 1a-1d, the 3D display apparatus may further include a quarter-wave plate 9 located on a side of the analyzer 5 facing the second substrate 2, that is, the quarter-wave plate 9 is located at an outer side of the analyzer 5.

If the quarter-wave plate 9 is not provided, the light emitted through the analyzer 5 is linearly polarized light. Accordingly, the viewer can only view 3D images within a certain angle (i.e., within the range of viewing angles). After the quarter-wave plate 9 is disposed, the quarter-wave plate 9 can function as optical rotation to convert the linearly polarized light into circularly polarized light or elliptically polarized light, thereby further expanding the viewing angle.

In some embodiments, as shown I FIGS. 1a, 1c, and 1d, the quarter-wave plate 9 may be disposed between the analyzer 5 (i.e., the first bidirectional metal grating polarizer 51) and the second substrate 2. As shown in FIG. 1b, the ¼ wave plate 9 can also be disposed between the analyzer 5 (i.e., the first bidirectional metal grating polarizer 51) and the color filter layer 8.

In some embodiments, the optical axis of the quarter-wave plate 9 is respectively at an angle of 45° to the polarization directions of the two types of linearly polarized light generated by the polarizer 4. As such, the quarter-wave plate 9 can convert the two types of linearly polarized light into circularly polarized light, thereby allowing the viewer to view the 3D image at any viewing angle. As a result, the viewing angle is further expanded.

In one embodiment, the optical axis of the quarter-wave plate 9 is not set as described above. However, the ¼ wave plate 9 still can convert the two types of linearly polarized light into elliptically polarized light, and the effect of expanding the viewing angle can be observed, although the effect thereof is not as excellent as that described above.

In some embodiments, the 3D display apparatus may further include an anti-reflection layer 10 on the side of the second substrate 2 opposite from the analyzer 5 for preventing glare.

In some embodiments, as shown in FIGS. 1a-1d, the polarizer 4 is a second bidirectional metal grating polarizer 41. As shown in FIG. 2, the second bidirectional metal grating polarizer 41 includes odd-numbered columns and even-numbered columns of equal width. The odd-numbered column represents the first polarizing unit, and the even-numbered column represents the second polarizing unit. The polarization direction of the odd-numbered columns of the first bidirectional metal grating polarizer 51 is perpendicular to the polarization direction of the odd-numbered columns of the second bidirectional metal grating polarizer 41, and the polarization direction of the even-numbered columns of the first bidirectional metal grating polarizer 51 is perpendicular to the polarization direction of the even-numbered columns of the second bidirectional metal grating polarizer 41. As such, the analyzer 5 and the polarizer 4 cooperate with each other to realize normal image display.

As shown in FIG. 1a, the second bidirectional metal grating polarizer 41 is located on the side of the first base substrate 1 opposite from the first alignment layer 6. As shown in FIGS. 1b to 1d, the second bidirectional metal grating polarizer 41 may also be located between the first base substrate 1 and the first alignment layer 6. That is, the polarizer 4 (i.e., the second bidirectional metal grating polarizer 41) may be disposed at the outer side of the base substrate 1, or may be disposed at the inner side of the base substrate 1. FIG. 1a shows a structure in which the polarizer 4 is disposed at the outer side of the base substrate 1, and FIGS. 1b-1d show structures in which the polarizer is disposed at the inner side of the base substrate 1.

The position of the color filter layer 8 will be described in detail below with reference to FIGS. 1a-1d. As shown in FIG. 1a, a color film layer 8 can be positioned between the analyzer 5 and the second alignment layer 7. As shown in FIG. 1b, the color film layer 8 may also be located between the analyzer 5 and the second substrate 2. As shown in FIG. 1c, the color film layer 8 may also be located between the second bidirectional metal grating polarizer 41 and the first alignment layer 6. As shown in FIG. 1d, the color film layer 8 may also be located between the first base substrate 1 and the second bidirectional metal grating polarizer 41.

In the structure shown in FIG. 1a, the distance h between the color filter layer 8 and the analyzer 5 is the smallest, and the corresponding viewing angle θ is the largest.

In some embodiments, the 3D display apparatus may further include a backlight module disposed on a side of the first base substrate 1 opposite from the liquid crystal layer 3, that is, on the outer side of the first base substrate 1.

It should be noted that the 3D display apparatus may be a TN (Twisted Nematic) type, an STN (Super Twisted Nematic) type, or an IPS (In-Plane Switching) type display apparatus.

Another embodiment of the present disclosure provides a 3D display apparatus. In this 3D display apparatus, comparing to the 3D display apparatus described above, the structure of the polarizer is different, and the position of the color film layer is different.

Figure 4A:
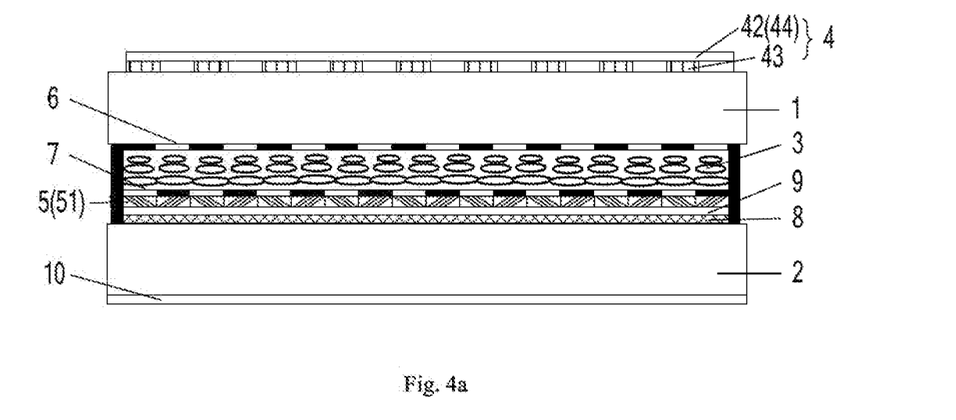
FIG. 4a is a structural diagram of a 3D display apparatus according to one embodiment of the present disclosure.
Figure 4B:
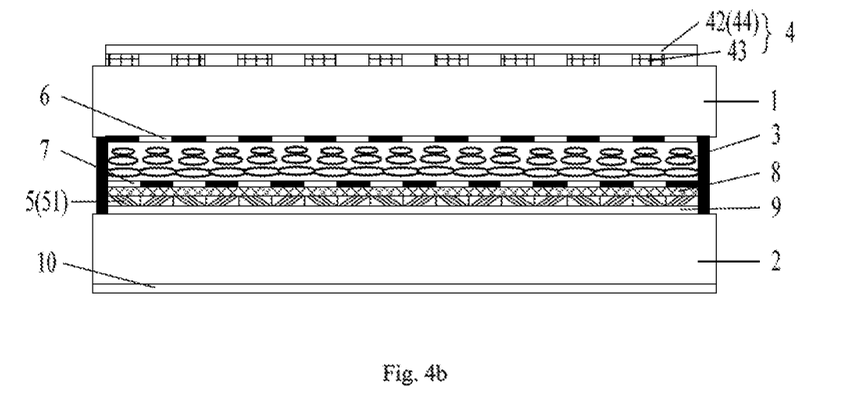
FIG. 4b is a structural diagram of a 3D display apparatus according to one embodiment of the present disclosure.

In some embodiments, as shown in FIGS. 4a and 4b, the first polarizing unit of the polarizer 4 includes a first polarizer 42 and a half-wave plate 43, which are stacked together. The second polarizing unit of the polarizer 4 includes a second polarizer 44 and a half-wave plate 43. The half-wave plate 43 and the second polarizer 44 have the same width, and the first polarizer 42 and the second polarizer 44 are integrally formed. The half-wave plate 43 corresponds to the position of a column of sub-pixels of the 3D display apparatus.

The first polarizer 42, the second polarizer 44, and the half-wave plate 43 are located on a side of the first base substrate 1 opposite from the first alignment layer 6, and the half-wave plate 43 is located between the first polarizer 44 and the first substrate 1.

In some embodiments, as shown in FIG. 4a, the color film layer 8 is located on the side of the analyzer 5 opposite from the second alignment layer 7. That is, the color film layer 8 is located between the quarter-wave plate 9 and the second substrate 2, and the color film layer 8 and the analyzer 5 are separated by a quarter-wave plate 9. As shown in FIG. 4b, the color film layer 8 may also be located on the side of the analyzer 5 facing the second alignment layer 7, that is, the color film layer 8 is located between the second alignment layer 7 and the analyzer 5.

In the structure shown in FIG. 4b, the distance h between the color film layer 8 and the analyzer 5 is the smallest, and the corresponding viewing angle θ is the largest.

Another example of the present disclosure further provides a method for preparing a bidirectional metal grating polarizer. The bidirectional metal grating polarizer may be the first bidirectional metal grating polarizer 51 or the second bidirectional metal grating polarizer 41 as described above. Hereinafter, the first bidirectional metal grating polarizer swill be described as an example in conjunction with FIG. 5.

Figure 5:
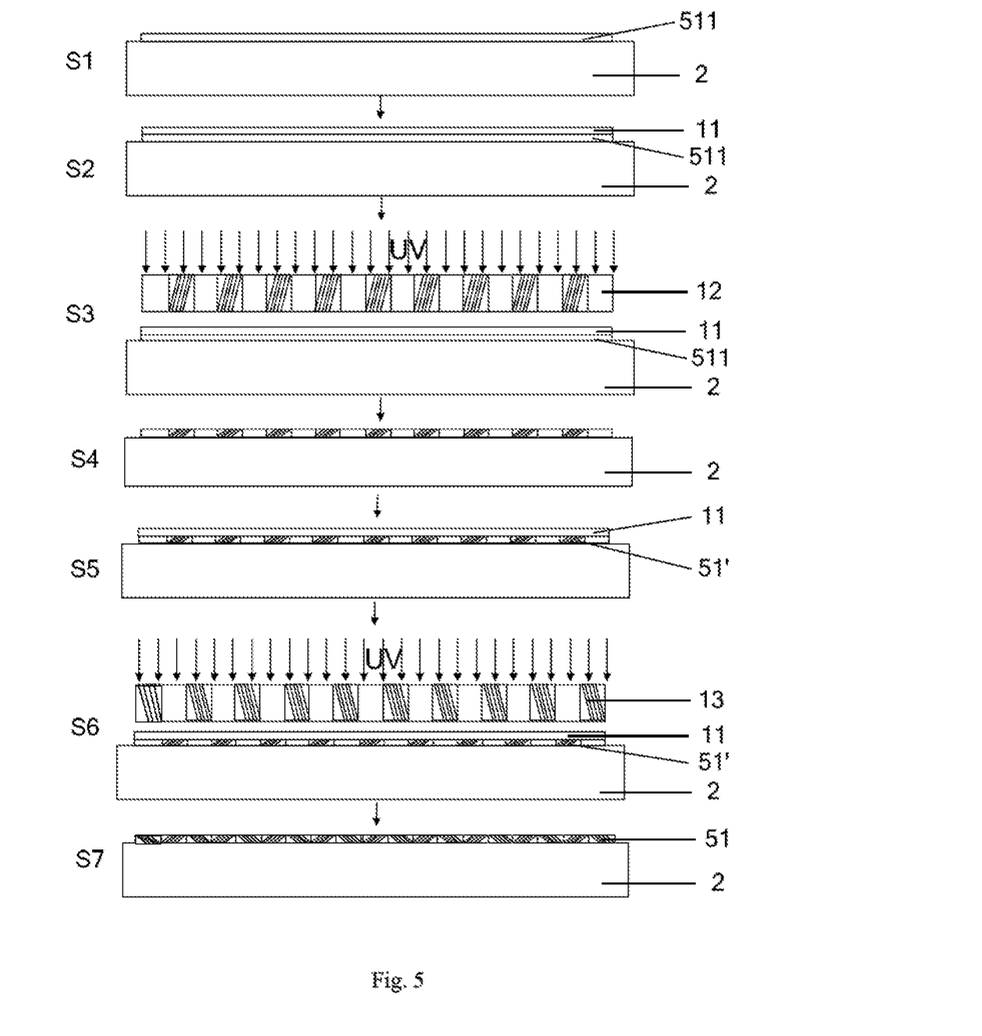
FIG. 5 is a flow chart of a method of preparing a bidirectional metal grating polarizer according to one embodiment of the present disclosure.

As shown in FIG. 5, the process of preparing the first bidirectional metal grating polarizer includes the following steps:

In step S1, a metal layer is deposited on the base substrate.

In one embodiment, a metal layer 511 is deposited on the second substrate 2, and the metal layer 511 can be made of a metal having a relatively high photoactivity, such as copper.

In steps S2-S4, a first lithographic pattern is formed by a patterning process using a first mask on the base substrate on which the metal layer was formed.

In one embodiment, the photoresist 11 is coated on the metal layer 511, and the photoresist 11 may be a positive photoresist or a negative photoresist.

In the embodiments of the present disclosure, a positive photoresist is taken as an example for description. Through the patterning process, the first mask 12 is employed and irradiated with UV (ultraviolet) light, followed by developing and etching to obtain the first lithographic pattern 51'.

In steps S5-S7, a second lithographic pattern is formed by a patterning process using a second mask on the substrate on which the first lithographic pattern was formed.

In one embodiment, a photoresist 11 (positive) is coated on the first lithographic pattern 51'. Through the patterning process, the second mask 13 is employed and irradiated with UV (ultraviolet) light, followed by developing and etching to obtain a second lithography pattern. The first lithographic pattern 51' and the second lithographic pattern constitute a pattern of the bidirectional metal grating polarizer 51.

The light transmitting portion of the first mask 12 corresponds to the non-light transmitting portion of the second mask 13. The non-transmitting portion of the first mask 12 corresponds to the light transmitting portion of the second mask 13. The first lithographic pattern of the odd-numbered columns or the even-numbered columns can be obtained by using the first mask 12, and the second lithographic pattern of the even-numbered columns or the odd-numbered columns can be obtained by using the second masking plate 13. As such, the first bidirectional metal grating polarizer 51 is obtained. Furthermore, the first lithographic pattern and the second lithographic pattern are both stripe-shaped, and the direction of the stripe of the first lithographic pattern and the direction of the stripe of the second lithographic pattern are perpendicular to each other. The design of the first mask 12 and the second mask 13 can reduce one step of metal deposition, thereby simplifying the fabrication process.

It can be seen from S1-S7 that the first bidirectional metal grating polarizer 51 can be directly formed on the second substrate 2. That is to say, the first bidirectional metal grating polarizer 51 can be directly formed on the base substrate, so that the analyzer 5 is formed inside the display module. As such, the distance between the analyzer 5 and the color film layer 8 can be reduced, thereby providing technical support for expanding the viewing angle and reducing the thickness and volume.

It should be noted that the second bidirectional metal grating polarizer 41 can also be prepared according to the above process, but is prepared on the first substrate 1.

The principle and the embodiment of the present disclosures are set forth in the specification. The description of the embodiments of the present disclosure is only used to help understand the method of the present disclosure and the core idea thereof. Meanwhile, for a person of ordinary skill in the art, the disclosure relates to the scope of the disclosure, and the technical scheme is not limited to the specific combination of the technical features, and also should covered other technical schemes which are formed by combining the technical features or the equivalent features of the technical features without departing from the inventive concept. For example, technical scheme may be obtained by replacing the features described above as disclosed in this disclosure (but not limited to) with similar features.

The reference numbers in the figures are:
1, First substrate
2, second substrate 3, liquid crystal layer
4, polarizer
5, analyzer
6, first alignment layer
7, second orientation layer
8, color film layer
9, quarter-wave plate
10, anti-reflection layer
11, photoresist
12, first mask
13, Second mask
511, metal layer
51', first lithography pattern
41, second bidirectional metal grating polarizer
42, the first polarizer
43, half wave plate
44, the second polarizer
51, first bidirectional metal grating polarizer

What is claimed is:

1. A 3D display apparatus, comprising:
a first substrate,
a second substrate,
a liquid crystal layer between the first substrate and the second substrate,
a first alignment layer on the first substrate,
a second alignment layer on the second substrate,
a polarizer, and
an analyzer between the second alignment layer and the second substrate,
wherein the polarizer is on a side of the first substrate opposite from the first alignment layer or between the first substrate and the first alignment layer, and the polarizer is configured to form two types of linearly polarized light being alternately arranged, and polarization directions of the two types of linearly polarized light being perpendicular to each other;
the 3D display apparatus further includes a backlight source and a color film layer; and
the color film layer is disposed between the second alignment layer and the analyzer, the color film layer is in contact with the analyzer, and the backlight source generates light passing through the color film layer to the analyzer in order;
the first polarizing units comprises a first polarizer and a half wave plate, the second polarizing unit comprises a second polarizer and the half wave plate, and the first polarizer and the second polarizer are integrally formed;
the first polarizer, the second polarizer, and the half wave plate are on a side of the first substrate opposite from the first alignment layer, and the half wave plate is between the first polarizer and the first substrate; and
the half wave plate is in contact with the first polarizer.

2. The 3D display apparatus of claim 1, wherein the polarizer comprises a plurality of alternately arranged first polarizing units and second polarizing units, a polarization direction of each of the plurality of first polarizing units is perpendicular to a polarization direction of each of the plurality of second polarizing units.

3. The 3D display apparatus of claim 2, wherein the analyzer comprises a plurality of alternately arranged first analyzer units and second analyzer units.

4. The 3D display apparatus of claim 3, wherein one of the plurality of first analyzer units corresponds to one of the plurality of first polarizing units and a polarization direction of the one of the plurality of first analyzer units is perpendicular to a polarization direction of the corresponding one of the plurality of first polarizing units; and
one of the plurality of second analyzer units corresponds to one of the plurality of second polarizing units and a polarization direction of the one of the plurality of second analyzer units is perpendicular to a polarization direction of the corresponding one of the plurality of second polarizing units.

5. The 3D display apparatus of claim 4, wherein the first alignment layer and the second alignment layer each comprise odd-numbered columns and even-numbered columns, the odd-numbered columns of the first alignment layer and the odd-numbered columns of the second alignment layer correspond to the first polarization units respectively, the even-numbered columns of the first alignment layer and the even-numbered columns of the second alignment layer correspond to the second polarization units respectively.

6. The 3D display apparatus of claim 5, wherein the odd-numbered columns of the first alignment layer and the even-numbered columns of the second alignment layer each have a first alignment direction, and the even-numbered columns of the first alignment layer and an odd-numbered columns of the second alignment layer each have a second alignment direction; the first alignment direction and the second alignment direction being respectively substantially the same as the polarization directions of the two linearly polarized light generated by the polarizer.

7. The 3D display apparatus of claim 6, wherein the odd-numbered columns and the even-numbered columns of the first alignment layer respectively correspond to one column of sub-pixels of the 3D display apparatus.

8. The 3D display apparatus of claim 1, further comprising a quarter-wave plate between the analyzer and the second substrate, wherein an optical axis of the quarter-wave plate is respectively at a 45° angle to the polarization directions of the two types of linearly polarized light.

9. The 3D display apparatus of claim 1, wherein the half-wave plate corresponds to the position of a column of sub-pixels of the 3D display apparatus.

10. The 3D display apparatus of claim 9, wherein a width of at least one of the first polarizing units, a width of at least one of the second polarizing units, a width of at least one of the first analyzer units, a width of at least one of the second analyzer units, a width of at least one of the odd-numbered columns of the first alignment layer, a width of at least one of the even-numbered columns of the first alignment layer, a width of at least one of the odd-numbered columns of the second alignment layer, and a width of at least one of the even-numbered columns of the second alignment layer are substantially equal to one another.

11. The 3D display apparatus of claim 1, further comprising an anti-reflection layer, the anti-reflection layer being on a side of the second substrate opposite from the analyzer.

12. The 3D display apparatus of claim 1, wherein the analyzer is a first bidirectional metal grating polarizer.

13. The 3D display apparatus of claim 1, wherein the polarizer is a second bidirectional metal grating polarizer.

* * * * *